United States Patent
Tani et al.

(10) Patent No.: US 9,242,553 B2
(45) Date of Patent: Jan. 26, 2016

(54) VEHICLE

(71) Applicant: ISEKI & CO., LTD., Ehime-ken (JP)

(72) Inventors: Yoshitaka Tani, Ehime-ken (JP); Shoji Komoda, Ehime-ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 0 days.

(21) Appl. No.: 14/468,434

(22) Filed: Aug. 26, 2014

(65) Prior Publication Data

US 2015/0060171 A1    Mar. 5, 2015

(30) Foreign Application Priority Data

Aug. 29, 2013  (JP) ................................. 2013-177843

(51) Int. Cl.
| | |
|---|---|
| *B60K 15/063* | (2006.01) |
| *B60T 7/06* | (2006.01) |
| *B60K 23/02* | (2006.01) |
| *B60K 15/03* | (2006.01) |

(52) U.S. Cl.
CPC ............. *B60K 15/063* (2013.01); *B60K 23/02* (2013.01); *B60T 7/06* (2013.01); *B60K 2015/03118* (2013.01); *B60K 2015/0634* (2013.01)

(58) Field of Classification Search
CPC ...... B60K 17/28; B60K 15/063; B60K 23/02; B60K 2015/03118; B60K 2015/0634; B62D 49/0692
USPC .............................................. 180/53.6, 69.4
See application file for complete search history.

(56) References Cited

U.S. PATENT DOCUMENTS

| | | | | |
|---|---|---|---|---|
| 6,877,580 | B2* | 4/2005 | Hasegawa .............. | B60K 17/06 180/292 |
| 7,735,594 | B2* | 6/2010 | Hidaka .................. | B62D 49/06 180/311 |
| 8,573,089 | B2* | 11/2013 | Nishino ................ | F16H 61/439 74/469 |
| 8,746,394 | B2* | 6/2014 | Kuramoto ............... | B60K 5/02 180/292 |
| 2003/0015363 | A1* | 1/2003 | Aoyama et al. ............ | 180/89.12 |
| 2008/0099264 | A1* | 5/2008 | Oka et al. ..................... | 180/69.2 |
| 2009/0101657 | A1* | 4/2009 | Matsumoto ................... | 220/562 |
| 2009/0242302 | A1* | 10/2009 | Fujiki ......................... | 180/89.12 |
| 2009/0260909 | A1* | 10/2009 | Oka et al. ...................... | 180/291 |
| 2009/0260912 | A1* | 10/2009 | Isogai ............................ | 180/336 |
| 2014/0097591 | A1* | 4/2014 | Fujimoto et al. ........... | 280/164.1 |

FOREIGN PATENT DOCUMENTS

| | | |
|---|---|---|
| JP | 62-88623 | 4/1987 |
| JP | 2011-168237 | 9/2011 |

* cited by examiner

*Primary Examiner* — Brodie Follman
*Assistant Examiner* — Brian Cassidy
(74) *Attorney, Agent, or Firm* — Wenderoth, Lind & Ponack, L.L.P.

(57) ABSTRACT

A vehicle, including: a brake pedal arranged at a right step side, a rotating shaft of the brake pedal being disposed on a transmission case; a clutch pedal arranged at a left step side, a rotating shaft of the clutch pedal being disposed on the transmission case; a right fuel tank disposed below a right step, and at a right side of the transmission case; and a left fuel tank disposed below a left step, and at a left side of the transmission case, wherein a pedal arm of the brake pedal is, in plane view, arranged between the transmission case and the right fuel tank, and a pedal arm of the clutch pedal is, in plane view, arranged between the transmission case and the left fuel tank.

3 Claims, 17 Drawing Sheets

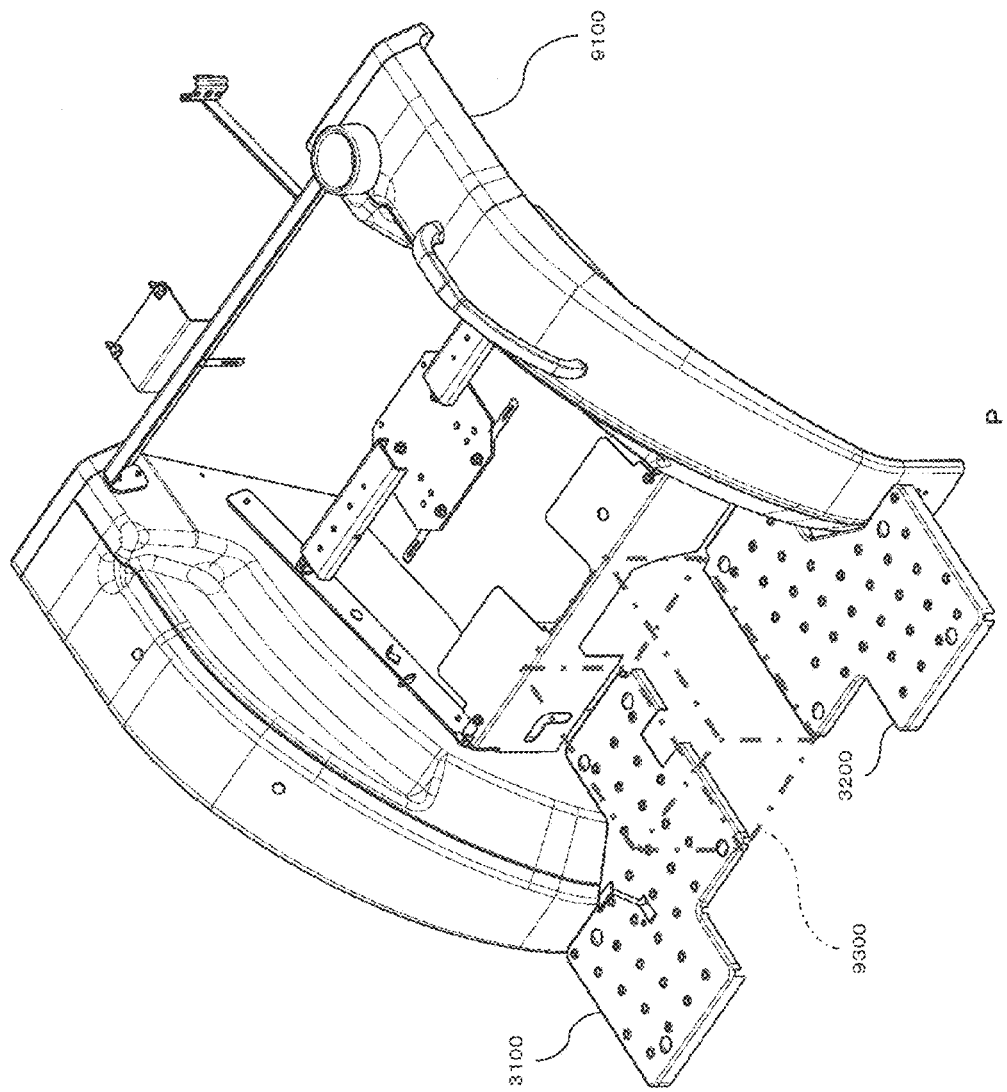

VEHICLE

BACKGROUND OF THE INVENTION

1. Field of the Invention

The present invention relates to a vehicle like an agricultural vehicle such as a tractor and the like.

2. Related Art of the Invention

In a vehicle like an agricultural vehicle such as a tractor and the like, by the motive force which is transmitted from the engine that uses the fuel of the fuel tank so as to generate the driving force, the rear wheels are driven.

And, the braking of the rear wheels is performed according to the pedal operation of the operator to the brake pedal, and the ON/OFF of the transmission of the motive force is performed according to the pedal operation of the operator to the clutch pedal.

In relation to a vehicle like this, known is one possessing a configuration such that the fuel tank is arranged inside the bonnet (for example, see Japanese Patent Application Publication No. 2011-168237) and that a variety of pedals like the brake pedal and the clutch pedal is hung from the dashboard (for example, see Japanese Patent Application Publication No. 62-88623).

However, the present inventors have noticed that, in a conventional vehicle, the fuel quantity of the fuel tank is not sufficiently large and the vehicle price is not sufficiently low.

Additionally, the present inventors think that why the fuel quantity of the fuel tank is not sufficiently large is that the fuel tank is arranged inside the bonnet.

Moreover, the present inventors think that why the vehicle price is not sufficiently low is that, because a variety of pedals is hung from the dashboard, the number of components increases according to the link number of the variety of pedals so that the vehicle configuration gets complicated.

SUMMARY OF THE INVENTION

The present invention furnishes, in consideration of the conventional problems described above, a vehicle able to allow the fuel quantity of the fuel tank to be larger, and to allow the vehicle price to be lower.

The $1^{st}$ aspect of the present invention is a vehicle, comprising:

a brake pedal arranged at a right step side, whose rotating shaft is disposed on a transmission case;

a clutch pedal arranged at a left step side, whose rotating shaft is disposed on the transmission case;

a right fuel tank disposed below the right step, and at a right side of the transmission case; and a left fuel tank disposed below the left step, and at a left side of the transmission case, wherein a pedal arm of the brake pedal is, in plane view, arranged between the transmission case and the right fuel tank, and a pedal arm of the clutch pedal is, in plane view, arranged between the transmission case and the left fuel tank.

By means of this, since the pedal arm of the pedal is arranged between the transmission case and the fuel tank, while the tank capacity is sufficiently ensured, the pedal configuration can be simplified, the fuel quantity of the fuel tank is enabled to be larger, and the vehicle price becomes enabled to be lower.

The $2^{nd}$ aspect of the present invention is a vehicle according to the $1^{st}$ aspect of the present invention, wherein a stepping portion of the brake pedal is, in plane view, arranged between the transmission case and the right fuel tank, and a stepping portion of the clutch pedal is, in plane view, arranged between the transmission case and the left fuel tank.

By means of this, since the stepping portion of the pedal is also arranged between the transmission case and the fuel tank, while the tank capacity is more sufficiently ensured, the pedal configuration can be more simplified, the fuel quantity of the fuel tank is enabled to be still larger, and the vehicle price becomes enabled to be still lower.

The $3^{rd}$ aspect of the present invention is a vehicle according to the $2^{nd}$ aspect of the present invention, wherein a part of the stepping portion of the brake pedal protrudes so as to be above at least one of the transmission case and the right fuel tank, and a part of the stepping portion of the clutch pedal protrudes so as to be above at least one of the transmission case and the left fuel tank.

By means of this, since a part of the stepping portion of the pedal protrudes so as to be above at least one of the transmission case and the fuel tank, while the tank capacity is more sufficiently ensured, the pedal configuration can be diversified, and the design freedom becomes able to be heightened.

The $4^{th}$ aspect of the present invention is a vehicle according to the $1^{st}$ aspect of the present invention, wherein a rear part of the left fuel tank has a rearward extending portion which passes above the rotating shaft of the clutch pedal so as to extend rearward.

By means of this, since the rear part of the fuel tank has the rearward extending portion, the tank capacity can be sufficiently ensured, and the fuel quantity of the fuel tank becomes enabled to be larger.

The $5^{th}$ aspect of the present invention is a vehicle according to the $1^{st}$ aspect of the present invention, wherein a front part of the left fuel tank has a frontward extending portion which extends frontward compared with a front end face of the left step, and at the frontward extending portion, an oil feeding inlet is disposed.

By means of this, since the front part of the fuel tank has the frontward extending portion, and at the frontward extending portion the oil feeding inlet is disposed, while the tank capacity is sufficiently ensured, the oil feeding inlet can be disposed, the fuel quantity of the fuel tank is enabled to be larger, and oil filling becomes able to be easily performed.

The $6^{th}$ aspect of the present invention is a vehicle according to the $5^{th}$ aspect of the present invention, wherein an upper face of a cap of the oil feeding inlet is disposed below the left step.

By means of this, since the upper face of the cap of the oil feeding inlet is disposed below the step, contact of an operator's shoe with the oil feeding inlet can be suppressed, and generation of damage of the oil feeding inlet and the like becomes able to be lessened.

The $7^{th}$ aspect of the present invention is a vehicle according to the $5^{th}$ aspect of the present invention, wherein an upper face of a cap of the oil feeding inlet is disposed above the left step.

By means of this, since the upper face of the cap of the oil feeding inlet is disposed above the step, low positioning of the oil feeding inlet can be suppressed, and generation of difficulty of oil filling and the like becomes able to be lessened.

By the present invention, a vehicle able to allow the fuel quantity of the fuel tank to be larger, and to allow the vehicle price to be lower can be furnished.

BRIEF DESCRIPTION OF THE DRAWINGS

FIG. 17 is a schematic perspective view of a neighborhood of the right step and left step of a tractor of an embodiment in the present invention.

Figure 1:
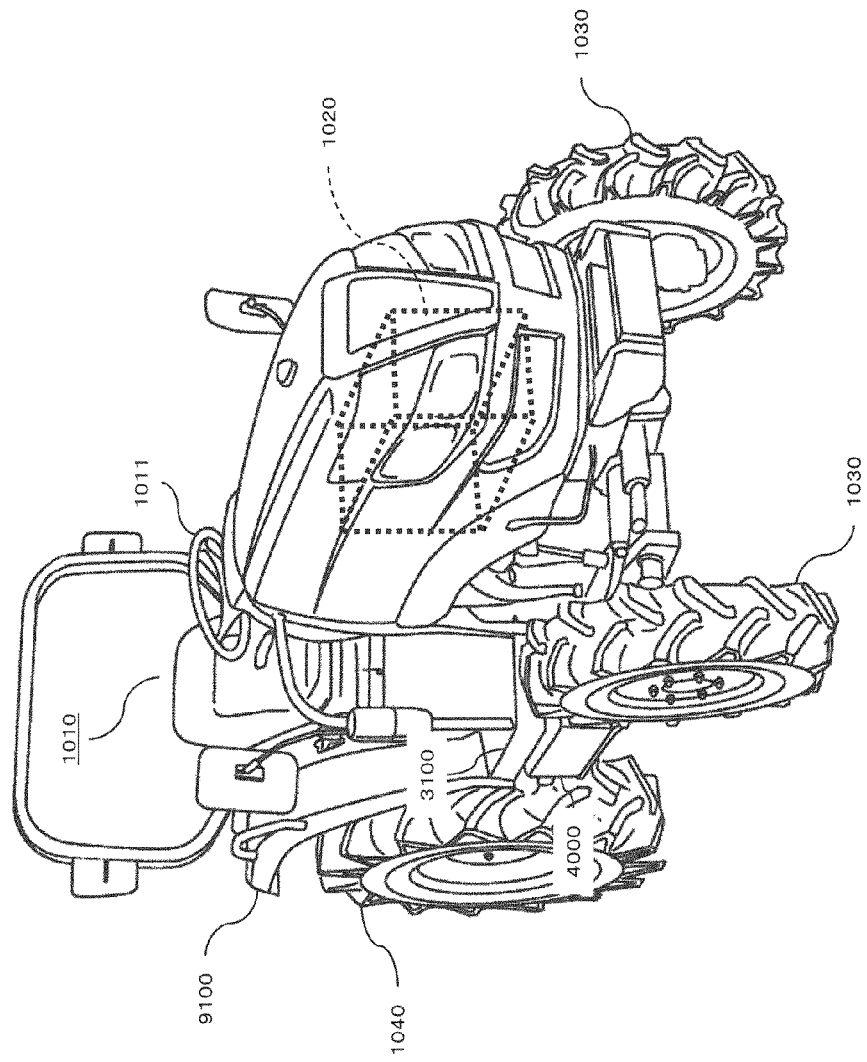
FIG. 1 is a schematic perspective view of a tractor of an embodiment in the present invention.

DESCRIPTION OF SYMBOLS 1010 driving seat
1011 steering handle
1020 engine
1030 front wheel
1040 rear wheel
2000 transmission case
3100 right step
3200 left step
3201 U-shaped plate
3210 auxiliary step
4000 right fuel tank
5000 left fuel tank
5100 frontward extending portion
5110 oil feeding inlet
5111 cap
5200 rearward extending portion
5300 fuel tank level gauge
5400 tank flange portion for installation
5500 cover plate for tank-lower-part-protection
6000 brake pedal mechanism
6010 right brake pedal
6011 stepping portion
6012 pedal arm
6020 left brake pedal
6021 stepping portion
6022 pedal arm
6100 rotating shaft
7000 clutch pedal
7001 stepping portion
7002 pedal arm
7100 rotating shaft
8000 step bracket
8001 U-shaped plate
8002 mount rubber for vibration-isolation
8003 pin for step-installation
8010 stay for front-side-tank-installation
8011 bolt for tank-installation
8020 stay for rear-side-tank-installation
9100 fender
9200 tap for loader-bracket-installation
9300 center cover

PREFERRED EMBODIMENTS OF THE INVENTION

In the following, referring to the drawings, descriptions are given in detail regarding embodiments in the present invention.

First, mainly referring to FIG. 1, descriptions are given regarding the configuration and action of a tractor of the present embodiment.

Here, FIG. 1 is a schematic perspective view of the tractor of the embodiment in the present invention.

In FIG. 1, the tractor is viewed from the right front side.

Additionally, the tractor of the present embodiment is one example of the vehicle of the present invention.

In the driving seat 1010, the steering handle 1011 for an operator's performing steering is disposed.

To the front wheels 1030 and the rear wheels 1040, the motive force for driving these is to be transmitted which has been generated by the engine 1020.

Next, mainly referring to FIGS. 2-15, descriptions are specifically given regarding the configuration and action of the tractor of the present embodiment.

Figure 2:
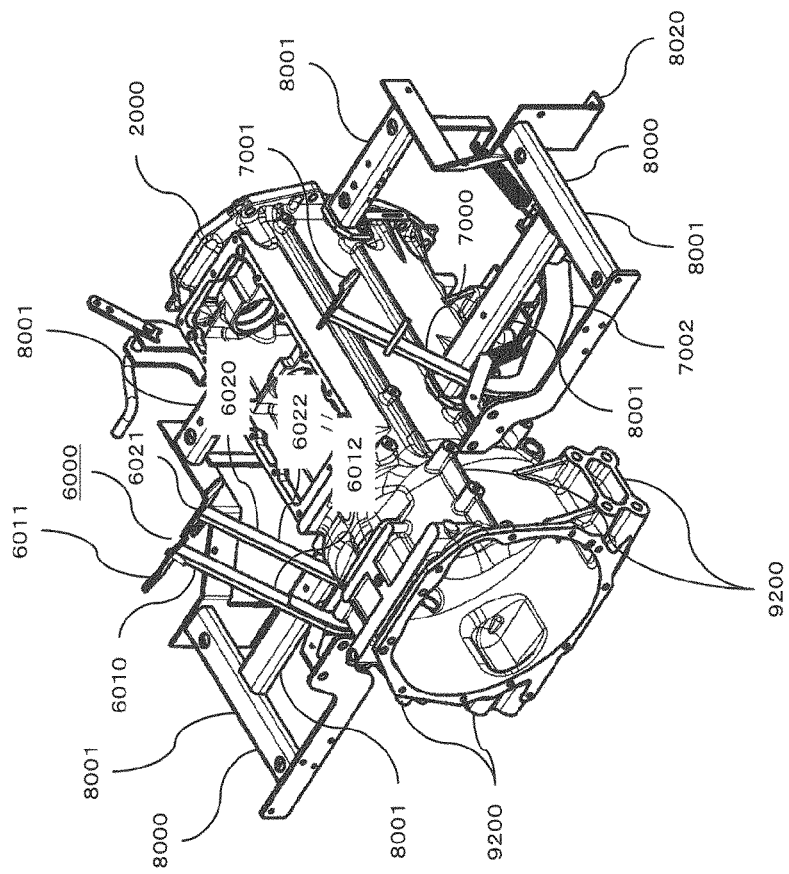
FIG. 2 is a schematic perspective view (No. 1) of a neighborhood of the transmission case of a tractor of an embodiment in the present invention.
Figure 3:
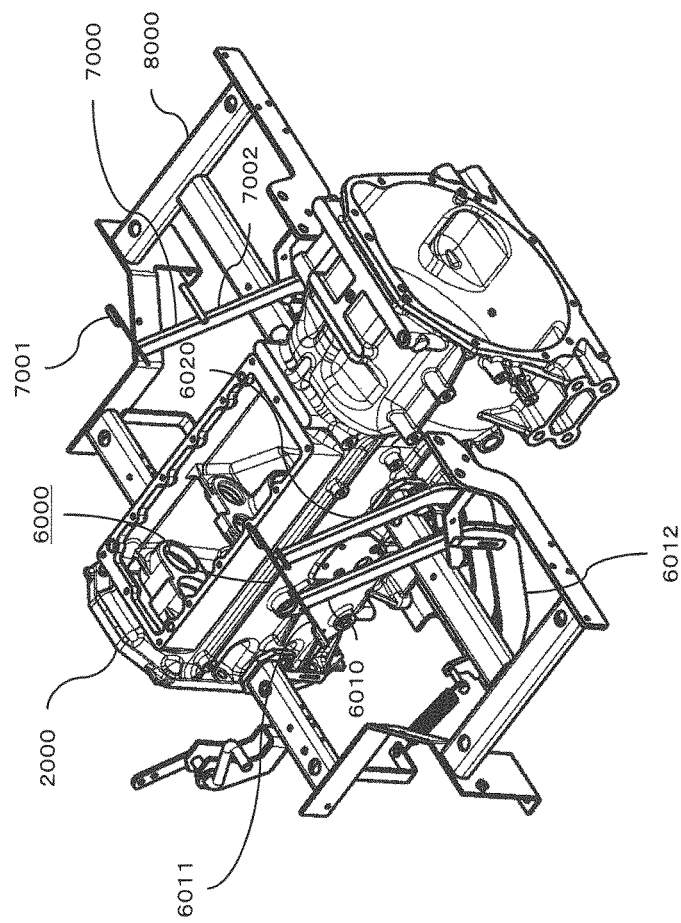
FIG. 3 is a schematic perspective view (No. 2) of a neighborhood of the transmission case of a tractor of an embodiment in the present invention.
Figure 4:
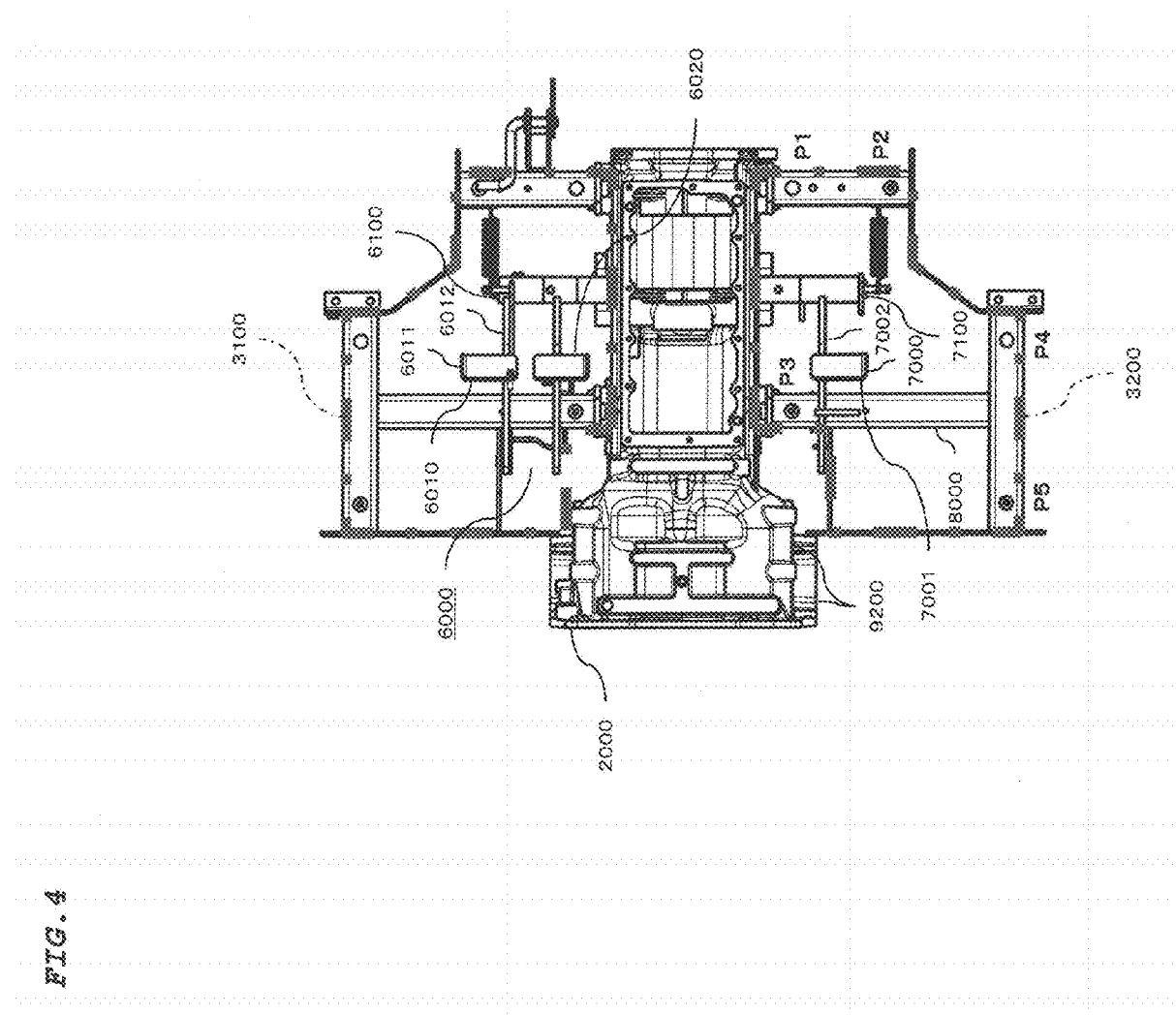
FIG. 4 is a schematic plan view (No. 1) of a neighborhood of the transmission case of a tractor of an embodiment in the present invention.
Figure 5:
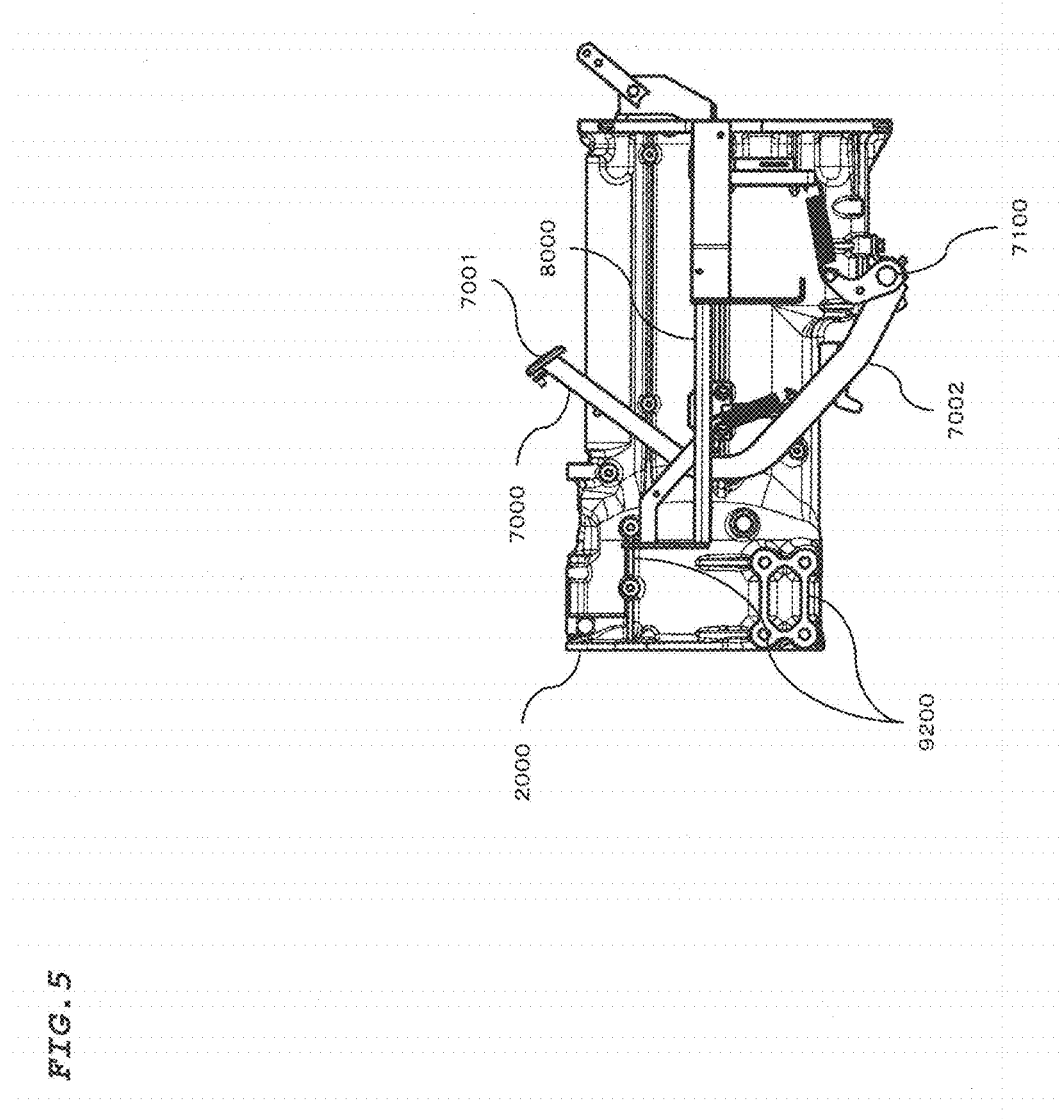
FIG. 5 is a schematic left side view (No. 1) of a neighborhood of the transmission case of a tractor of an embodiment in the present invention.
Figure 6:
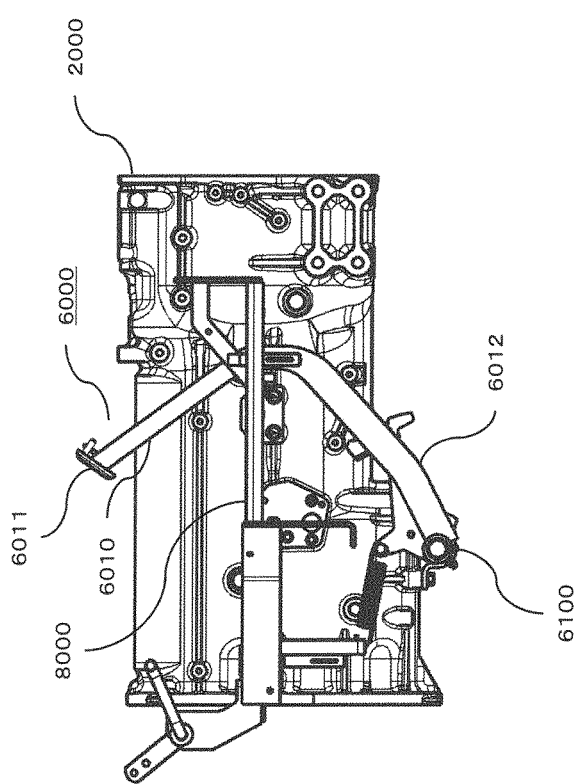
FIG. 6 is a schematic right side view (No. 1) of a neighborhood of the transmission case of a tractor of an embodiment in the present invention.
Figure 7:
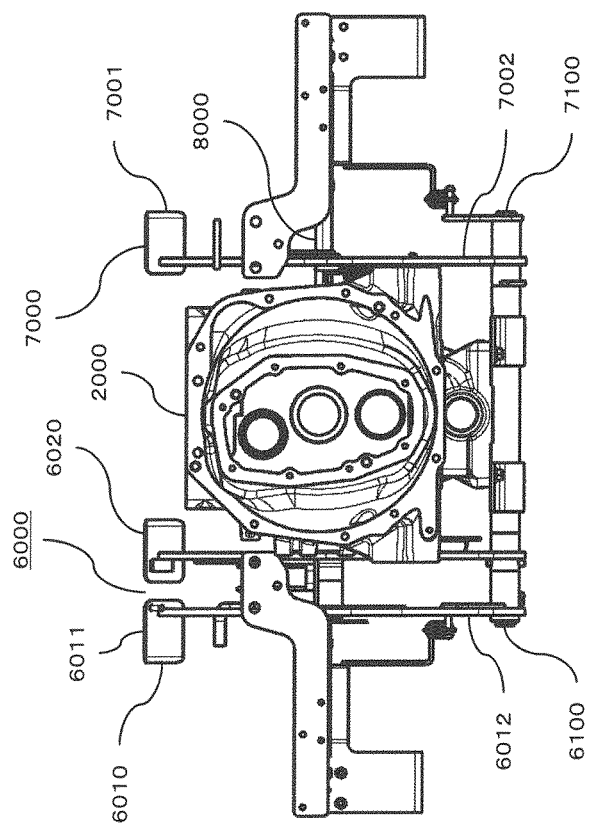
FIG. 7 is a schematic front view (No. 1) of a neighborhood of the transmission case of a tractor of an embodiment in the present invention.
Figure 8:
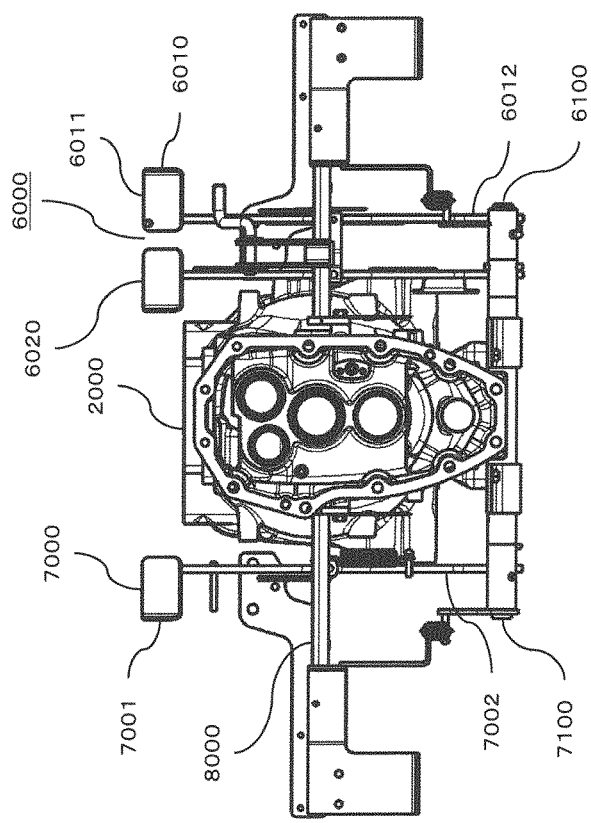
FIG. 8 is a schematic rear view (No. 1) of a neighborhood of the transmission case of a tractor of an embodiment in the present invention.

Here,

FIG. 2 is a schematic perspective view (No. 1) of a neighborhood of the transmission case 2000 of the tractor of the embodiment in the present invention, FIG. 3 is a schematic perspective view (No. 2) of a neighborhood of the transmission case 2000 of the tractor of the embodiment in the present invention, FIG. 4 is a schematic plan view (No. 1) of a neighborhood of the transmission case 2000 of the tractor of the embodiment in the present invention, FIG. 5 is a schematic left side view (No. 1) of a neighborhood of the transmission case 2000 of the tractor of the embodiment in the present invention, FIG. 6 is a schematic right side view (No. 1) of a neighborhood of the transmission case 2000 of the tractor of the embodiment in the present invention, FIG. 7 is a schematic front view (No. 1) of a neighborhood of the transmission case 2000 of the tractor of the embodiment in the present invention, and FIG. 8 is a schematic rear view (No. 1) of a neighborhood of the transmission case 2000 of the tractor of the embodiment in the present invention.

In FIGS. 2-8, the brake pedal mechanism 6000 and the clutch pedal 7000 are shown in the figures, but the right fuel tank 4000 and the left fuel tank 5000 are not shown in the figures.

In FIG. 2 the transmission case 2000 is viewed from the left front side, and in FIG. 3 the transmission case 2000 is viewed from the right front side.

In FIG. 4, the right step 3100 and the left step 3200 are virtually shown in the figure with the alternate long and short dash lines.

Figure 9:
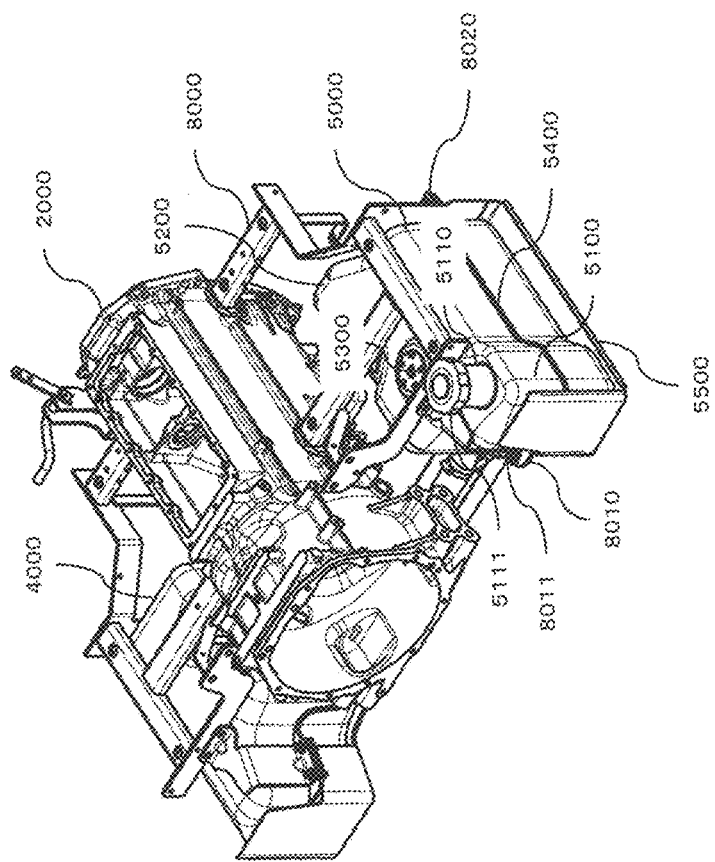
FIG. 9 is a schematic perspective view (No. 3) of a neighborhood of the transmission case of a tractor of an embodiment in the present invention.
Figure 10:
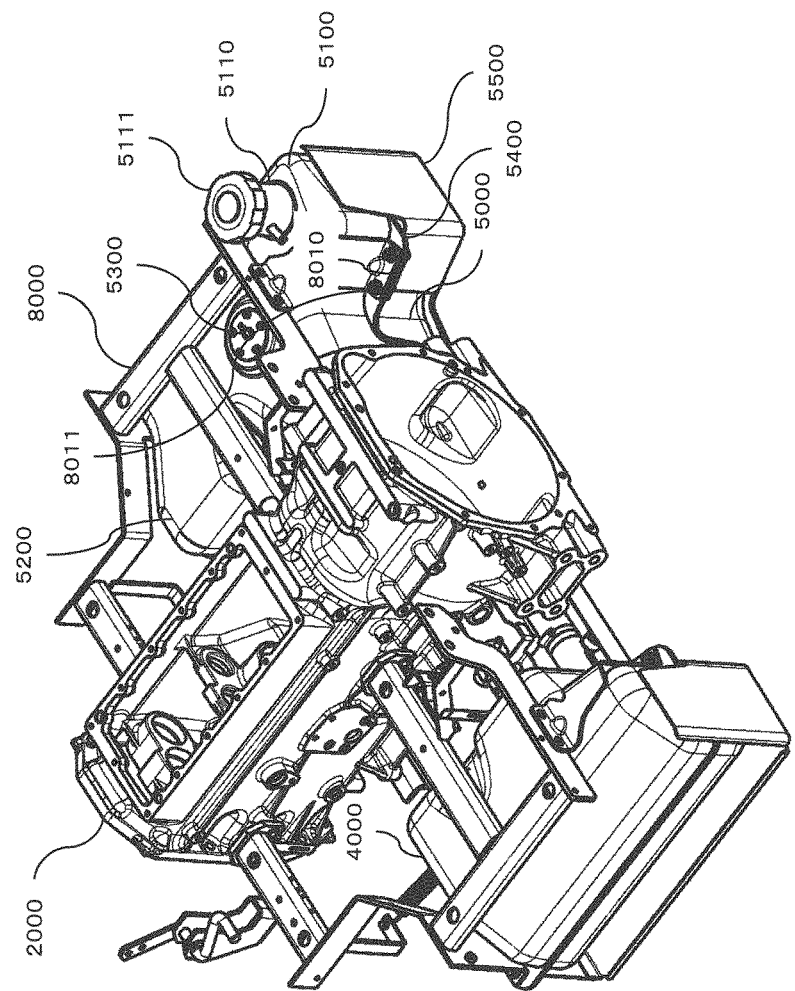
FIG. 10 is a schematic perspective view (No. 4) of a neighborhood of the transmission case of a tractor of an embodiment in the present invention.
Figure 11:
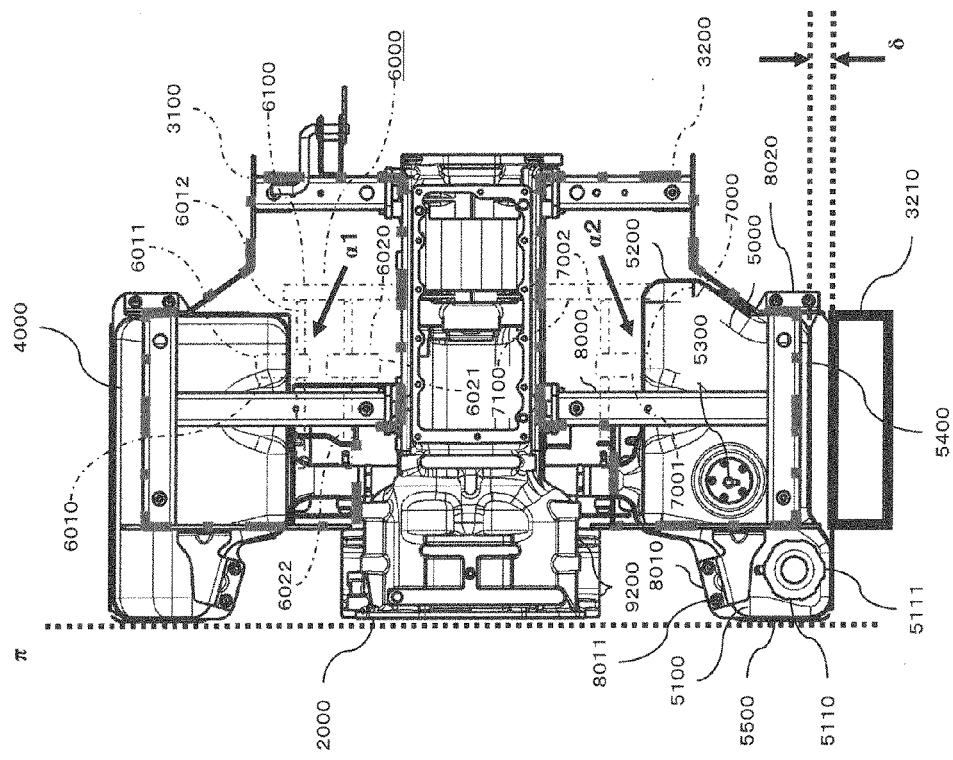
FIG. 11 is a schematic plan view (No. 2) of a neighborhood of the transmission case of a tractor of an embodiment in the present invention.
Figure 12A:
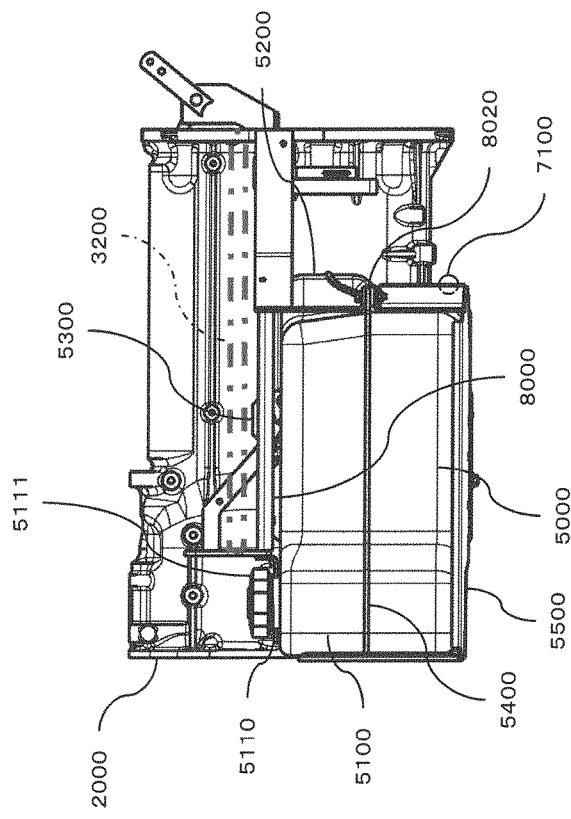
FIG. 12A is a schematic left side view (No. 2) of a neighborhood of the transmission case of a tractor of an embodiment in the present invention.
Figure 12B:
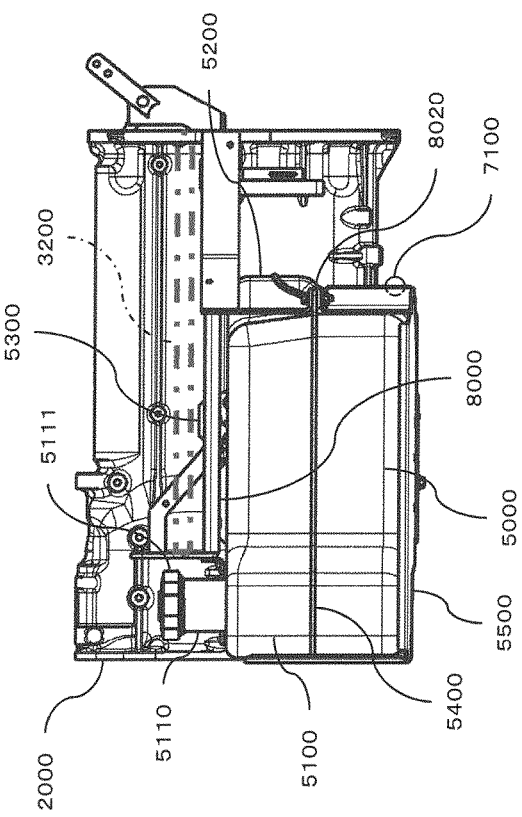
FIG. 12B is a schematic left side view of a neighborhood of the transmission case of a tractor of another embodiment in the present invention.
Figure 13:
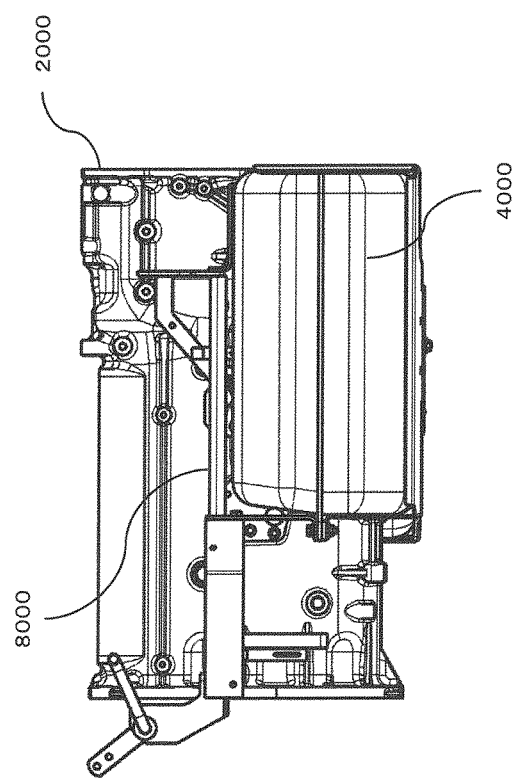
FIG. 13 is a schematic right side view (No. 2) of a neighborhood of the transmission case of a tractor of an embodiment in the present invention.
Figure 14:
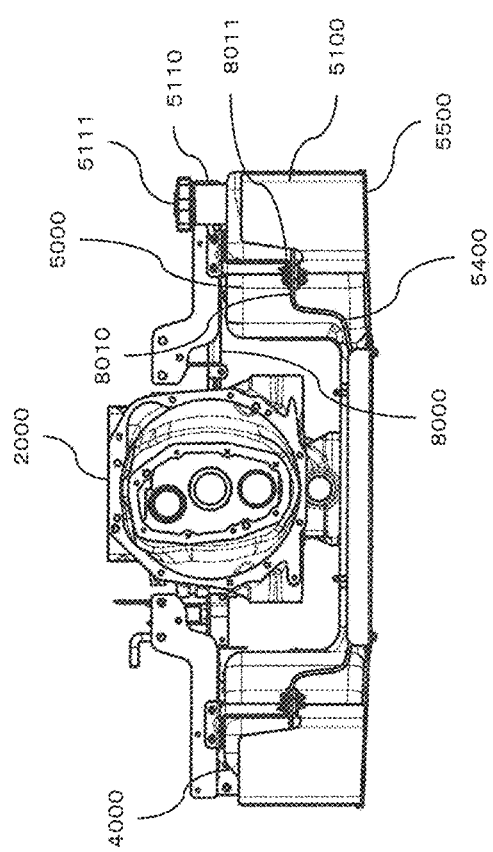
FIG. 14 is a schematic front view (No. 2) of a neighborhood of the transmission case of a tractor of an embodiment in the present invention.
Figure 15:
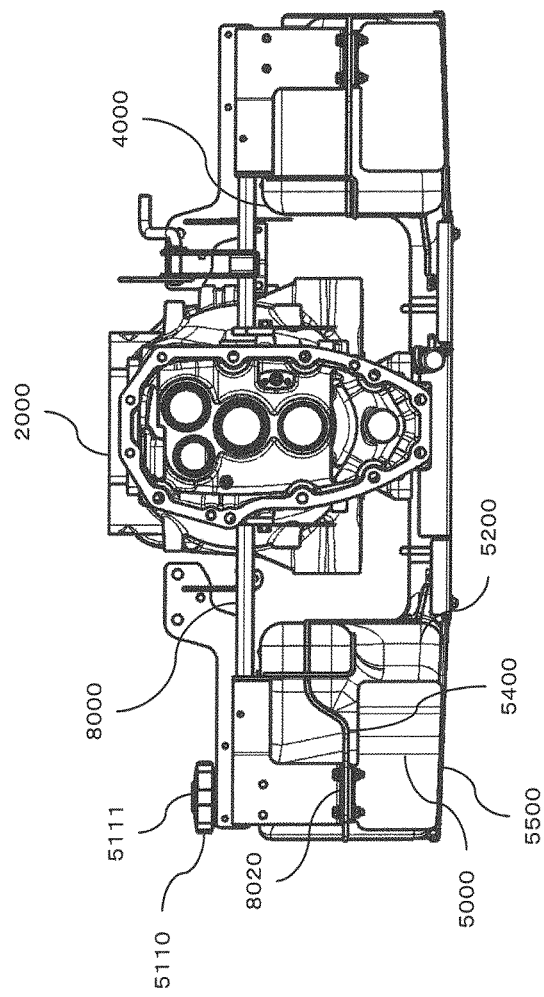
FIG. 15 is a schematic rear view (No. 2) of a neighborhood of the transmission case of a tractor of an embodiment in the present invention.

Further,

FIG. 9 is a schematic perspective view (No. 3) of a neighborhood of the transmission case 2000 of the tractor of the embodiment in the present invention, FIG. 10 is a schematic perspective view (No. 4) of a neighborhood of the transmission case 2000 of the tractor of the embodiment in the present invention, FIG. 11 is a schematic plan view (No. 2) of a neighborhood of the transmission case 2000 of the tractor of the embodiment in the present invention, FIG. 12A is a schematic left side view (No. 2) of a neighborhood of the transmission case 2000 of the tractor of the embodiment in the present invention, FIG. 12B is a schematic left side view of a neighborhood of the transmission case 2000 of the tractor of another embodiment in the present invention, FIG. 13 is a schematic right side view (No. 2) of a neighborhood of the transmission case 2000 of the tractor of the embodiment in the present invention, FIG. 14 is a schematic front view (No. 2) of a neighborhood of the transmission case 2000 of the tractor of the embodiment in the present invention, and FIG. 15 is a schematic rear view (No. 2) of a neighborhood of the transmission case 2000 of the tractor of the embodiment in the present invention.

In FIGS. 9, 10 and 12-15, the right fuel tank 4000 and the left fuel tank 5000 are shown in the figures, but the brake pedal mechanism 6000 and the clutch pedal 7000 are not shown in the figures.

In FIG. 9 the transmission case 2000 is viewed from the left front side, and in FIG. 10 the transmission case 2000 is viewed from the right front side.

In FIG. 11, the right fuel tank 4000 and the left fuel tank 5000 are shown in the figures, and the brake pedal mechanism 6000 and the clutch pedal 7000, and the right step 3100 and the left step 3200 are virtually shown in the figure with the alternate long and short dash lines as well. Additionally, in FIG. 11, the rotating shaft 6100 and the rotating shaft 7100 are also virtually shown in the figure with the alternate long and short dash lines.

In FIGS. 12A and 12B, the left step 3200 is virtually shown in the figures with the alternate long and short dash lines.

The tractor of the present embodiment comprises the brake pedal mechanism 6000, the clutch pedal 7000, the right fuel tank 4000, and the left fuel tank 5000.

The brake pedal mechanism 6000 is a means arranged on the right step 3100, in which the rotating shaft 6100 is disposed on the transmission case 2000. Of course, the brake pedal mechanism 6000 need not be arranged on the right step 3100 itself, and may be arranged on an element at the side of the right step 3100.

The clutch pedal 7000 is a means arranged on the left step 3200, in which the rotating shaft 7100 is disposed on the transmission case 2000. Of course, the clutch pedal 7000 need not be arranged on the left step 3200 itself, and may be arranged on an element at the side of the left step 3200.

The right fuel tank 4000 is a means disposed below the right step 3100, and at the right side of the transmission case 2000.

The left fuel tank 5000 is a means disposed below the left step 3200, and at the left side of the transmission case 2000.

The brake pedal mechanism 6000 is, in plane view, arranged between the transmission case 2000 and the right fuel tank 4000.

The clutch pedal 7000 is, in plane view, arranged between the transmission case 2000 and the left fuel tank 5000.

The rear part of the left fuel tank 5000 possesses a level difference, and has the rearward extending portion 5200 which passes above the rotating shaft 7100 of the clutch pedal 7000 so as to extend rearward.

The front part of the left fuel tank 5000 has the frontward extending portion 5100 which extends frontward compared with the front end face of the left step 3200.

At the frontward extending portion 5100, the oil feeding inlet 5110 is disposed.

The upper face of the cap 5111 of the oil feeding inlet 5110 is disposed above the left step 3200.

Next, mainly referring to FIGS. 2-15, descriptions are more specifically given regarding the configuration and action of the tractor of the present embodiment.

The brake pedal mechanism 6000 has the right brake pedal 6010 and the left brake pedal 6020, which are configured to be connected on the occasion of traveling on the road and the like, and possess similar configurations.

The right brake pedal 6010 has the stepping portion 6011 which is configured to be stepped upon by the operator, and the pedal arm 6012 with the upper end part joined to the stepping portion 6011 and the lower end part joined to the rotating shaft 6100.

The stepping portion 6011 and the pedal arm 6012 are, in plane view, arranged between the transmission case 2000 and the right fuel tank 4000. Of course, the stepping portion 6011 may protrude therefrom, namely, a part of the stepping portion 6011 may be above at least one of the transmission case 2000 and the right fuel tank 4000.

Similarly, the left brake pedal 6020 has the stepping portion 6021 which is configured to be stepped upon by the operator, and the pedal arm 6022 with the upper end part joined to the stepping portion 6021 and the lower end part joined to the rotating shaft 6100.

The stepping portion 6021 and the pedal arm 6022 are, in plane view, arranged between the transmission case 2000 and the right fuel tank 4000. Of course, the stepping portion 6021 may protrude therefrom, namely, a part of the stepping portion 6021 may be above at least one of the transmission case 2000 and the right fuel tank 4000.

The clutch pedal 7000 has the stepping portion 7001 which is configured to be stepped upon by the operator, and the pedal arm 7002 with the upper end part joined to the stepping portion 7001 and the lower end part joined to the rotating shaft 7100.

The stepping portion 7001 and the pedal arm 7002 are, in plane view, arranged between the transmission case 2000 and the left fuel tank 5000. Of course, the stepping portion 7001 may protrude therefrom, namely, a part of the stepping portion 7001 may be above at least one of the transmission case 2000 and the left fuel tank 5000.

The right fuel tank 4000 and the left fuel tank 5000 are arranged at the right and left sides of the transmission case 2000 respectively, get into the lower sides of the right step 3100 and left step 3200 respectively and get into the lower sides of the step brackets 8000 respectively, which support these steps.

And, the inner sides of the front parts of the right fuel tank 4000 and left fuel tank 5000 are shaped concavely, so that they do not interfere with the brake pedal mechanism 6000 and the clutch pedal 7000 respectively, which are protrudingly disposed from the lower sides of the side faces of the transmission case 2000.

A conventional configuration such that a variety of pedals is hung from the dashboard is, since the number of components increases according to the link number of the variety of pedals, not desirable from the viewpoint of a cost but, regarding a configuration such that the fuel tanks are arranged on both left/right sides of the transmission case and a variety of pedals is protrudingly disposed from the side faces of the transmission case as well, since interference between the fuel tanks and the variety of pedals is prone to occur despite a little number of components, it has been thought that the adoption thereof is difficult particularly for a medium-sized tractor of 30 horsepower or more.

By the present embodiment, avoiding interference between the right fuel tank 4000 and left fuel tank 5000 and the brake pedal mechanism 6000 and clutch pedal 7000, an economical configuration with a little number of components is able to be realized.

Of course, the inner sides of the rear parts of the right fuel tank 4000 and left fuel tank 5000 may be shaped convexly, so that they do not interfere with the brake pedal mechanism 6000 and the clutch pedal 7000 respectively.

For example, in a case where only at the upper sides the inner sides of the rear parts of the right fuel tank 4000 and left fuel tank 5000 extend towards the side faces of the transmission case 2000, avoiding interference between the right fuel tank 4000 and left fuel tank 5000 and the rotating shafts 6100 and 7100, a configuration with a large tank capacity is able to be realized.

Next, the rear parts of the right fuel tank 4000 and left fuel tank 5000 possess shapes three-dimensionally in accordance with the so-called drawing-bending-shape of the front end part of the fender 9100.

By the present embodiment, avoiding interference between the right fuel tank 4000 and left fuel tank 5000 and the fender 9100, a configuration with a large tank capacity is able to be realized.

Next, the inner sides of the front parts of the right fuel tank 4000 and left fuel tank 5000 are shaped concavely, so that they do not obstruct the taps 9200 for loader-bracket-installation respectively.

At the upper sides of the side faces of the front transmission case, taps for loader-bracket-installation for installing the front loader bracket are often disposed.

By the present embodiment, the loader bracket is easy to install, and a configuration with installation work of a so-called optional work device being easy is able to be realized.

Next, the fuel tank level gauge 5300 is arranged, so that at least a part thereof hides at the lower side of the left step 3200.

Fuel tank level gauge accessory components such as the terminals for fuel-tank-level-gauge-installation of the fuel tank level gauge which is a sensor, the machine screws for fuel-tank-level-gauge-installation and the like are, if a protection member and the like are not disposed at the upper sides, usually exposed.

By the present embodiment, avoiding exposure of the fuel tank level gauge accessory components, an economical configuration with a little number of components is able to be realized.

Next, the insert pipes (not shown) of the breather hose (not shown) which joins the right fuel tank 4000 and the left fuel tank 5000 are disposed so that they face, in the neighborhoods of the positions α1 and α2 (see FIG. 11) symmetric regarding the left/right direction which provide the minimum distance between the fuel tanks, the right fuel tank 4000 and the left fuel tank 5000 respectively.

In a case where plural fuel tanks are used, it is desirable to improve the breather performance by disposing a breather hose which joins these fuel tanks.

By the present embodiment, the inner part pressure loss of the breather hose is decreased so as to improve the oil filling performance, and an economical configuration with so-called spillover and the like being less prone to be generated is able to be realized.

Next, the front end faces of the right fuel tank 4000 and left fuel tank 5000, and the front end face of the transmission case 2000 are both roughly included in one plane π (see FIG. 11).

By the present embodiment, disassembling/assembling work to the engine 1020 and transmission case 2000 which are joined by bolts and the like is easy to perform, and a configuration with maintenance being easy is able to be realized.

Next, the rear parts of the right fuel tank 4000 and left fuel tank 5000 not only possess, as described above, shapes in accordance with the shape of the front end part of the fender 9100, but are, by the front end part of the fender 9100 which is prolonged to the neighborhood of the position P (see FIG. 17) so that it gets under the right step 3100 and left step 3200, covered so that they are protected from mud and the like which are splashed up from the rear wheels 1040.

By the present embodiment, a dedicated tank cover for mud guarding is omitted, and an economical configuration with a little number of components is able to be realized.

Next, the upper face of the cap 5111 of the oil feeding inlet 5110 is, as described above, disposed above the left step 3200 in the present embodiment, but may be disposed below the left step 3200 (see FIGS. 12A and 12B).

Of course, since oil filling is difficult to perform in case the oil feeding inlet is disposed excessively below, it is desirable that the upper face of the cap of the oil feeding inlet be disposed above the step bracket.

In the present embodiment where the oil feeding inlet 5110 is disposed above the left step 3200, when the operator steps on the left step 3200 and performs getting on and off, there is a fear that the shoe gets in contact with the oil feeding inlet 5110 which is also called a tank-neck.

By another embodiment like this (see FIG. 12B) where the oil feeding inlet 5110 is disposed below the left step 3200, since the shoe is less prone to get in contact with the oil feeding inlet 5110, a configuration with little fear of adhesion of mud to the oil feeding inlet and/or damage of the oil feeding inlet is able to be realized.

Next, as described above, the front part of the left fuel tank 5000 has the frontward extending portion 5100 which extends frontward compared with the front end face of the left step 3200.

The left fuel tank 5000 gets into the lower side of the left step 3200, and is arranged so that almost all the part thereof hides at the lower side of the left step 3200, but the frontward extending portion 5100 contributes toward increase of the tank capacity and contributes toward placement of a functioning member such as the oil feeding inlet 5110 and the like as well.

By the present embodiment, promoting space saving, a functional configuration with a large tank capacity is able to be realized.

Next, as described above, at the frontward extending portion 5100, the oil feeding inlet 5110 is disposed.

In a case where the oil feeding inlet gets into the lower side of the step, the fuel which has spilled down on the occasion of oil filling is prone to overflow on the step and/or oil feeding inlet cleaning such as removing of the mud which has adhered and the like is difficult to perform. And, a member such as a lid, a plate or the like which covers the oil feeding inlet is often necessary for safety.

By the present embodiment, all sorts of maintenance are easy, and an economical configuration with a little number of components is able to be realized.

And, since a joystick lever for operating the front loader is usually disposed in the neighborhood of the right side of the driving seat 1010 not in the neighborhood of the left side, there is almost no fear that the oil feeding inlet 5110 hinders operation of the joystick lever.

By the present embodiment, the front loader is easy to operate, and a configuration with operation of a so-called optional work device being easy is able to be realized.

Next, the left end face of the left fuel tank 5000 is shaped concavely, so that the distance δ (see FIG. 11) to the left outer side of the left step 3200 where the auxiliary step 3210 is installed is approximately several tens of millimeters.

The vehicle-total-width in the left/right direction which is stipulated by the SAE (Society of Automotive Engineers) standard is 150 meters or less, including the auxiliary step 3210.

If the width of at least one of the left step and the auxiliary step is kept down, then the vehicle-total-width like that which is stipulated by the SAE standard is able to be easily satisfied, and it is thought that work trouble due to a too large vehicle-total-width at the time of agricultural work and storing work to a storing but is also almost never generated.

However, in case the width of the left step is simply kept down, then there is a fear that the space in the machine-body layout around the foot of the operator becomes too narrow and, in case the width of the auxiliary step is simply kept down, since the shoe is prone to get in contact with the left end face of the left fuel tank, then there is a fear that the operator loses his or her footing from the auxiliary step.

By the present embodiment, while a sufficient width of the left step 3200 and a sufficient width of the auxiliary step 3210 are both ensured, the auxiliary step 3210 is allowed to get close to the left step 3200 and installed by using the distance δ, and a lawful configuration with almost no issue of safety and the like is able to be realized.

Next, as described above, the upper face of the cap 5111 of the oil feeding inlet 5110 is disposed above the left step 3200.

By the present embodiment, the distance between the oil feeding inlet 5110 and the left step 3200 is sufficiently ensured with a gap approximately over 1 inch, generation of finger pinching of the operator at the time of opening/closing of the oil feeding inlet 5110, intruding into the oil feeding inlet 5110 of the mud which has spilled down from the left step 3200, and the like is decreased, and a configuration with almost no issue of safety and the like is able to be realized.

Next, the installation of the right fuel tank 4000 and left fuel tank 5000 is performed by the stays 8020 for rear-side-tank-installation which cooperate with the taps for tank-installation and the like that are disposed, using the step brackets 8000.

The step brackets 8000, which enclose the side faces of the transmission case 2000, the front end part of the fender 9100, the outer end faces of the right step 3100 and left step 3200, and the rear end faces of the right step 3100 and left step 3200, possess shapes such that the rigidity in the upper/lower direction is high, so that they are capable of securely supporting the right step 3100 and the left step 3200, and are also capable of securely supporting the right fuel tank 4000 and left fuel tank 5000 which get into the lower sides thereof.

By the present embodiment, a large-scale dedicated member for tank-installation is omitted, and an economical configuration with a little number of components is able to be realized.

Next, the stays 8010 for front-side-tank-installation are shaped slantwise with respect to the side faces of the transmission case 2000, so that the gaps are formed between the transmission case 2000 and the stays 8010 for front-side-tank-installation.

At the upper sides of the side faces of the front transmission case, as described above, taps for loader-bracket-installation for installing the front loader bracket are often disposed.

If gaps are formed between the transmission case and the stays for front-side-tank-installation, then it is thought that work trouble at the time of installation of the loader bracket is almost never generated.

However, in case the gaps between the transmission case and the stays for front-side-tank-installation are formed straight not slantwise, then the space for the fuel tanks becomes sacrificed, and there is a fear that the tank capacity is reduced.

By the present embodiment, avoiding reduction of the tank capacity, a configuration with installation work of a so-called optional work device being easy is able to be realized.

Next, the installation of the right fuel tank 4000 and left fuel tank 5000 is performed, for example, by the stays 8010 for front-side-tank-installation where the holes for tank-installation are disposed which are long holes largish with respect to the bolts 8011 for tank-installation.

The stays for tank-installation are often disposed at plural spots, for example, at the front side and the rear side as in the present embodiment.

If at least a part of the installation of the fuel tanks is performed by a stay for tank-installation which uses bolts, not by welding, then it is thought that the installation work of the tanks becomes considerably easy.

However, in case the holes for tank-installation are disposed which are not long holes largish with respect to the bolts for tank-installation and are holes of the same size, since the position accuracy of the holes for installation is not necessarily good which are disposed at the tank flange portion for installation of the fuel tank that is often produced by blow molding whose accuracy is bad in comparison with injection molding, then the setup easiness of the tank is influenced by the tank molding accuracy, and eventually there is a fear that the installation work of the tanks does not become sufficiently easy.

By the present embodiment, a configuration with installation work of the tanks being easy is able to be realized.

And, the bolt 8011 for tank-installation screws to the stay 8010 for front-side-tank-installation, the tank flange portion 5400 for installation, the cover plate 5500 for tank-lower-part-protection, and a nut in this order from the upper side.

It is desirable that, between the tank flange portion 5400 for installation which is disposed on the left fuel tank 5000, and the cover plate 5500 for tank-lower-part-protection which protects the left fuel tank 5000 from the lower side, a plate with taps be inserted.

In case a plate with taps is arranged at the lower side of the tank flange portion 5400 for installation, since the position of the stay 8010 for front-side-tank-installation and the position of the tank flange portion 5400 for installation are first fixed by the longish bolts 8011 for tank-installation which have been intercalated from the upper side, then after that the cover plate 5500 for tank-lower-part-protection and the nuts are able to be easily installed from the lower side.

Since the longish bolts 8011 for tank-installation are intercalated into the holes which are disposed at the cover plate 5500 for tank-lower-part-protection, ease of fitting as in a case where a so-called flat button is used is realized.

Further, since the nuts are installed from the lower side, exerted by the so-called looseness prevention principle of a double nut is the effect of looseness prevention which is required particularly in a case where a tank made of resin is fitted.

Of course, a large-scale dedicated member for installing the cover plate for tank-lower-part-protection is unnecessary.

By the present embodiment, curtailing the number of components, a configuration with installation work of the tanks being easy is able to be realized.

Figure 16:
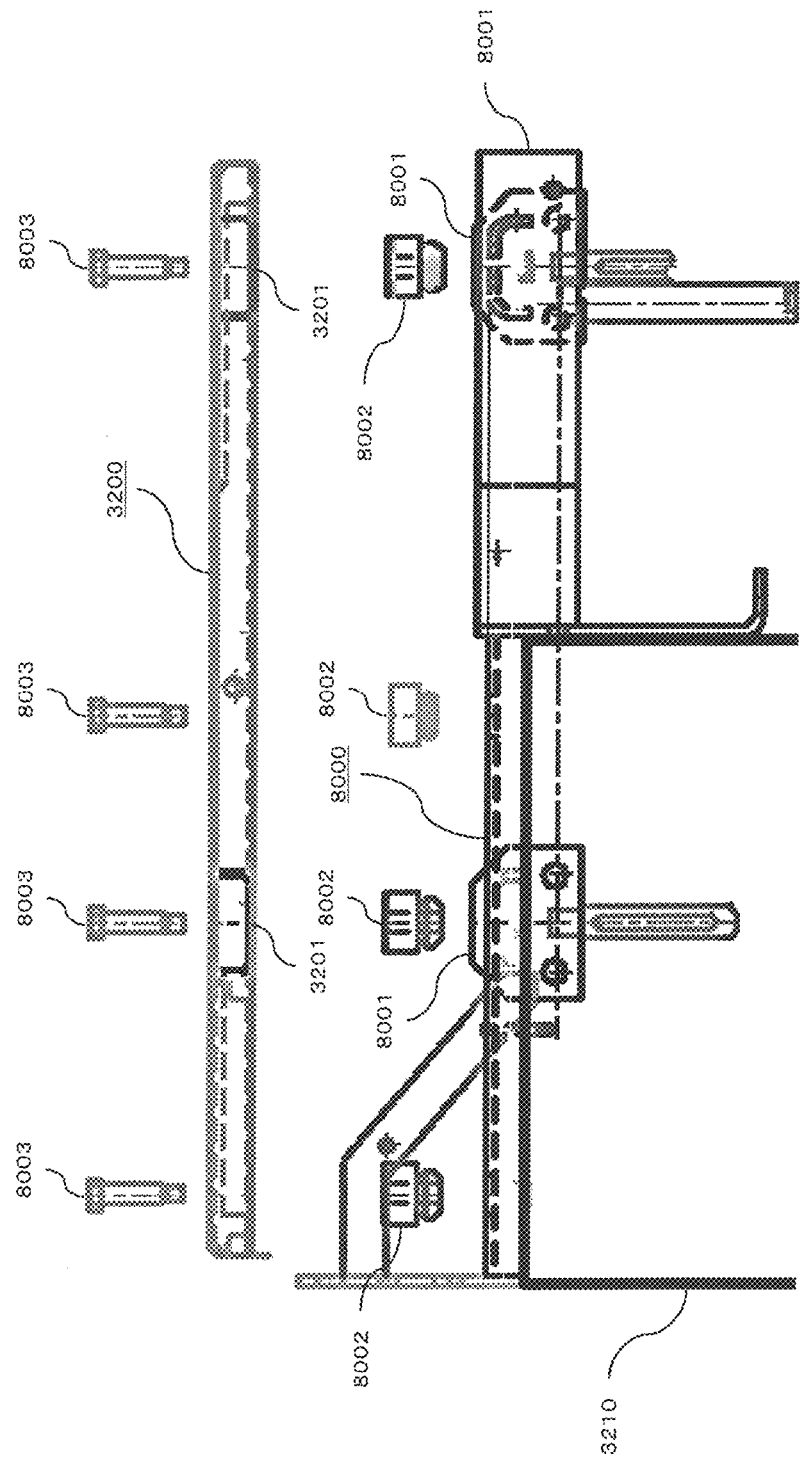
FIG. 16 is a schematic section view of a neighborhood of the left step of a tractor of an embodiment in the present invention.

Next, mainly referring to FIGS. 16 and 17, descriptions are still more specifically given regarding the configuration and action of the tractor of the present embodiment.

Here,

FIG. 16 is a schematic section view of a neighborhood of the left step 3200 of the tractor of the embodiment in the present invention, and FIG. 17 is a schematic perspective view of a neighborhood of the right step 3100 and left step 3200 of the tractor of the embodiment in the present invention.

In FIG. 17, the center cover 9300 is virtually shown in the figure with the alternate long and short dash lines.

(A) Onto the side faces of the transmission case 2000, the step brackets 8000 for placing the right step 3100 and left step 3200 are installed.

The right step 3100 and the left step 3200 are not directly installed onto the transmission case 2000, and are placed on the mount rubbers 8002 for vibration-isolation which are installed onto the step brackets 8000.

The mount rubber 8002 for vibration-isolation is a rubber member which possesses a simple nearly-columnar-shape, and an excellent vibration-isolation effect is exerted with a low-price configuration.

(B) The step bracket 8000 is a member such that the plural U-shaped plates 8001 are integrally joined by welding, whose sectional shapes in relation to the sections perpendicular to the longitudinal directions are U-shaped shapes.

In a case where a plate whose plate thickness is large, a pipe or the like is used for obtaining high rigidity, the step bracket 8000 often becomes large, and the price also becomes high.

However, regarding the U-shaped plate 8001, the section modulus is large, the weight is small and, since the configuration by welding is simple, a lightweight configuration which possesses high rigidity is realized at a low price.

(C) The shapes of the step brackets 8000 are, in plane view, shapes in accordance with the shapes of the right step 3100 and left step 3200 which are placed thereon.

In case the configuration of the step brackets 8000 which possesses the above-described high rigidity is combined with the shapes in accordance with the shapes of the right step 3100 and left step 3200, then large strength which leads to high rigidity of the right step 3100 and left step 3200 is able to be used at the maximum.

(D) To the lower face portions of the right step 3100 and left step 3200 which are placed on the step brackets 8000, which are in contact with the U-shaped plates 8001 of the step brackets 8000, the similar U-shaped plates 3201 are welded.

And, the sectional shape of the U-shaped plate 3201 like this of the right step 3100 and left step 3200 is, in the upper/lower direction, symmetric with the sectional shape of the above-described U-shaped plate 8001 of the step brackets 8000.

Since the U-shaped plates 3201 of the right step 3100 and left step 3200 are welded at the positions where they overlap with the U-shaped plates 8001 of the step brackets 8000, cumulatively large strength is realized.

Hereupon, it is desirable that the plate thickness of the U-shaped plate 3201 of the right step 3100 and left step 3200 be smaller than the plate thickness of the U-shaped plate 8001 of the step brackets 8000, so that a lightweight configuration is realized at a low price.

(E) The mount rubbers 8002 for vibration-isolation are inlaid into the pockets formed at the U-shaped plates 8001 of the step bracket 8000.

An additional member for allowing the strength to be further large is unnecessary, and the mount rubber 8002 for vibration-isolation which possesses a simple nearly-columnar-shape is able to be easily inlaid as it is into the pocket formed at the U-shaped plate 8001 of the step bracket 8000.

Since the mount rubbers 8002 for vibration-isolation are inlaid into the U-shaped plate 8001 which possesses large strength, the U-shaped plate 8001 is less prone to be deformed by deflection and the like, only the mount rubbers 8002 for vibration-isolation are deformed, and an excellent vibration-isolation effect is exerted with a low-price configuration.

(F) And, the mount rubbers 8002 for vibration-isolation are arranged at plural spots, for example, as in the present embodiment, at five spots in the neighborhoods of the positions P1, P2, P3, P4 and P5 (see FIG. 4) regarding the left step 3200, and the height of each of the mount rubbers 8002 for vibration-isolation which are arranged at these plural spots is, in a usual state, set so that only some of the mount rubbers 8002 for vibration-isolation get in contact with the left step 3200 which is placed thereon.

(G) More specifically, in a state where the operator is sitting on the driving seat 1010, the height of the upper faces of the mount rubbers 8002 for vibration-isolation at two spots of the positions P1 and P4 is set smaller than the height of the lower face of the left step 3200 approximately by 1.5 millimeters, and only the mount rubbers 8002 for vibration-isolation at three spots of the remaining positions P2, P3 and P5 are in contact with the left step 3200 with the whole upper faces.

Because of this, when the operator is sitting on the driving seat 1010 and performing work, only the mount rubbers 8002 for vibration-isolation at three spots come in contact with the left step 3200 and, since resonance and the like are less prone to be generated, the operator can perform work without uncomfortable feeling.

And, when the operator steps on the left step 3200 and performs getting on and off, the mount rubbers 8002 for vibration-isolation at five spots all get in contact with the left step 3200 because of the body weight of the operator and, since deflection of the left step 3200 and the like are absorbed, the operator can perform getting on and off without uncomfortable feeling.

(H) The front end face of the step bracket 8000 is, for allowing the strength of the step bracket 8000 to be large, directly joined to the transmission case 2000.

Of course, for example, in the left/right direction a stay for step-bracket-installation is disposed from the lower side of the side face of the dashboard towards the machine-body outer side, in the left/right direction a stay is disposed from the front end face of the step bracket 8000 towards the machine-body inner side and, also by joining these with bolts and the like, high rigidity of the step bracket 8000 is able to be obtained.

And, by using these stays newly disposed, a so-called HST (Hydro Static Transmission) link stay, a member for stopper-installation of the variety of pedals, and the like may be installed.

(I) The pin 8003 for step-installation passes through the right step 3100 or the left step 3200, the mount rubber 8002 for vibration-isolation, and the step bracket 8000 in this order from the upper side, and fixes these at the center.

And, at the right step 3100 and the left step 3200 holes with spotfacing through which the pins 8003 for step-installation pass are formed and, for the neighborhood of the upper end of the pin 8003 for step-installation, in a usual state, the portion of the length approximately of 2 millimeters is protruding.

Since the length of the pin 8003 for step-installation is set largish like this, and shaking in the horizontal directions can be dealt with, an excellent vibration-isolation effect is exerted with a low-price configuration.

(J) The front end faces of the right step 3100 and left step 3200, and the front end face of the center cover 9300 which is installed therebetween are trued up at the tip end lines so that they look as if they are integrated.

Since uncomfortable feeling is not caused even if the right step 3100 and the left step 3200 are simple in shape, and complicated draw processing and the like are also unnecessary, shapes of aesthetic outward appearance are realized at a low price.

A vehicle in the present invention, which is able to allow the fuel quantity of the fuel tank to be larger, and to allow the vehicle price to be lower, is useful for an objective of use as an agricultural vehicle such as a tractor and the like.

What is claimed is:

1. A vehicle comprising:
   a brake pedal arranged at a right step side, a rotating shaft of the brake pedal being disposed on a transmission case;
   a clutch pedal arranged at a left step side, a rotating shaft of the clutch pedal being disposed on the transmission case;
   a right fuel tank disposed below a right step, and at a right side of the transmission case; and
   a left fuel tank disposed below a left step, and at a left side of the transmission case, wherein:
   a pedal arm of the brake pedal is, in plane view, arranged between the transmission case and the right fuel tank,
   a pedal arm of the clutch pedal is, in plane view, arranged between the transmission case and the left fuel tank,
   a stepping portion of the brake pedal is, in plane view, arranged between the transmission case and the right fuel tank,
   a stepping portion of the clutch pedal is, in plane view, arranged between the transmission case and the left fuel tank,
   a part of the stepping portion of the brake pedal protrudes so as to be above at least one of the transmission case and the right fuel tank,
   a part of the stepping portion of the clutch pedal protrudes so as to be above at least one of the transmission case and the left fuel tank,
   a rear part of the left fuel tank has a rearward extending portion which extends rearwardly above the rotating shaft of the clutch pedal,
   a front part of the left fuel tank has a frontward extending portion which extends frontwardly relative to a front end face of the left step,
   an oil feeding inlet is disposed at the frontward extending portion,
   a mount rubber for vibration-isolation is arranged at each of five spots with respect to the right step such that, in a state in which an operator is sitting on a driving seat, a height of an upper face of the mount rubber for vibration-isolation at each of two of the five spots with respect to the right step is less than a height of a lower face of the right step, and a whole upper face of the mount rubber for vibration-isolation at each of the remaining three of the five spots with respect to the right step is in contact with the right step, and
   a mount rubber for vibration-isolation is arranged at each of five spots with respect to the left step such that, in the state in which the operator is sitting on the driving seat, a height of an upper face of the mount rubber for vibration-isolation at each of two of the five spots with respect to the left step is less than a height of a lower face of the left step, and a whole upper face of the mount rubber for vibration-isolation at each of the remaining three of the five spots with respect to the left step is in contact with the left step.

2. A vehicle according to claim 1, wherein
an upper face of a cap of the oil feeding inlet is disposed below the left step, and
a rear part of the right fuel tank and the rear part of the left fuel tank have shapes in accordance with a shape of a front end part of a fender which is prolonged so as to fit under the right step and the left step.

3. A vehicle according to claim 1, wherein
an upper face of a cap of the oil feeding inlet is disposed above the left step, and
a rear part of the right fuel tank and the rear part of the left fuel tank have shapes in accordance with a shape of a front end part of a fender which is prolonged so as to fit under the right step and the left step.

* * * * *